United States Patent
Bruijns et al.

[11] Patent Number: 5,974,113
[45] Date of Patent: Oct. 26, 1999

[54] COMPOSING AN IMAGE FROM SUB-IMAGES

[75] Inventors: Antonius J. C. Bruijns; Johannes A. Luijendijk, both of Eindhoven, Netherlands

[73] Assignee: U.S. Philips Corporation, New York, N.Y.

[21] Appl. No.: 08/670,262

[22] Filed: Jun. 14, 1996

[30] Foreign Application Priority Data

Jun. 16, 1995 [EP] European Pat. Off. .............. 95201614

[51] Int. Cl.$^6$ ...................................................... H05G 1/64
[52] U.S. Cl. ........................................ 378/98.7; 378/98.12
[58] Field of Search ................................ 378/98.7, 98.12

[56] References Cited

U.S. PATENT DOCUMENTS 5,778,044  7/1998  Bruijns ................................... 378/98.7

FOREIGN PATENT DOCUMENTS

3315882  11/1984  Germany .

Primary Examiner—Craig E. Church
Attorney, Agent, or Firm—Dwight H. Renfrew

[57] ABSTRACT

An image pick-up apparatus (1) for picking up a plurality of sub-images and combining them so as to form a composite image, including a correction unit (5) for correcting brightness values of the composite image. The correction unit (5) includes a selection unit (6) for selecting bright and dark parts from the sub-images. There is also provided an arithmetic unit (10) for deriving a gain correction factor from the bright parts and an offset correction term from the dark parts. The correction unit (5) also includes a multiplier unit (8) and an adder unit (9) for multiplying signal levels of a sub-image signal by the gain correction factor and for adding the offset correction term thereto. The image pick-up apparatus is used in an X-ray examination apparatus (20) for picking up an optical image on the exit window (32) of an X-ray image intensifier (24) and for supplying an electronic image signal for a high-resolution composite image so that image information in a medical X-ray image with small details can be suitably reproduced.

17 Claims, 4 Drawing Sheets

COMPOSING AN IMAGE FROM SUB-IMAGES

BACKGROUND OF THE INVENTION

1. Field of the Invention

The invention relates to an X-ray examination apparatus, including an X-ray source for emitting an X-ray beam in order to form an X-ray image of an object, an X-ray detector for deriving an optical image from the X-ray image, an image pick-up apparatus including one or more image sensors for deriving electronic sub-image signals from sub-images of the optical image, and a combination unit for combining the electronic sub-image signals so as to form an electronic image signal for a composite image. The invention also relates to an image pick-up apparatus including one or more image sensors for deriving electronic sub-image signals from sub-images and a combination unit for combining the electronic sub-image signals so as to form an electronic image signal for a composite image. The invention also relates to a method of composing a composite image from a first sub-image picked up by a first image sensor and a second sub-image picked up by a second image sensor.

2. Description of the Related Art

An image pick-up apparatus and a method of this kind are known from German Offenlegungsschrft DE 33 15 882.

The known X-ray examination apparatus including an X-ray source and an X-ray image intensifier whereto the image pick-up apparatus is optically coupled. An X-ray image is formed of an object, for example a patient to be radiologically examined who is arranged between the X-ray source and the X-ray image intensifier, by irradiating the object by means of an X-ray beam emitted by the X-ray source. The X-ray image is formed on an entrance screen of the X-ray image intensifier and converted into an optical image on an exit window of the X-ray image intensifier. The optical image is picked up by the image pick-up apparatus and converted into an electronic image signal. The light emanating from the exit screen is split into two sub-images by means of an image splitter including a partly transparent mirror, said sub-images being picked up by respective image sensors.

The known image pick-up apparatus includes two solid-state image sensors, each of which has a plurality of photosensitive elements. The image sensors are arranged in such a manner that pixels of the optical image which are picked up by one image sensor will be situated in the intermediate spaces between the photosensitive elements of the other sensor. Each image sensor picks up a respective sub-image and applies a respective sub-image signal to the combination unit which forms an image signal for a composite image from said sub-image signals. From the sub-images the image sensors derive electronic sub-image signals having signal levels which represent brightness values in the sub-images. The composite image consists of image lines of the sub-images which have been picked up by the individual sensors, i.e. in such a manner that image lines from one image sensor constitute the odd image lines in the composite image and image lines from the other sensor constitute the even image lines in the composite image. In the direction transversely of the image lines the composite image has a spatial resolution which has approximately been doubled in comparison with the sub-images picked up by the individual sensors.

The known image pick-up apparatus has the drawback that, even when the optical image has a uniform brightness, image lines from different image sensors may have different brightness values in the composite image because differences occur between signal levels of sub-image signals, even though they relate to brightness values from substantially the same positions on the exit window. The differences may be due inter alia to the fact that the individual image sensors receive light from the exit window via different optical paths with differences in light attenuation. Another cause of differences between brightness values of image lines from different image sensors is a difference between sensitivities of the individual image sensors. Such differences cause disturbances in the composite image. The composite image may exhibit, for example a streaky pattern which is not at all related to the image information in the optical image but is caused by unequal intensities of the sub-images or by unequal sensitivities of the individual image sensors. Due to the above causes, individual image sensors derive image signals having different signal levels from a light intensity in substantially the same position on the exit window. Two differences contribute to the difference between said signal levels: an offset difference and a gain difference.

SUMMARY OF THE INVENTION

An object of the invention is to provide an X-ray examination apparatus comprising an image pick-up apparatus enabling correction of variations of brightness values of the sub-images in respect of offset differences as well as in respect of gain differences, thus counteracting disturbances in the composite image.

To achieve this, an image pick-up apparatus in accordance with the invention is characterized in that it comprises a correction unit for correcting brightness values of the sub-images, which correction unit is arranged to derive a gain correction factor and an offset correction term from said electronic sub-image signals and comprises a signal processing system for deriving a corrected brightness value from a signal level of a sub-image signal, the gain correction factor and the offset correction term.

The signal level difference comprises a gain difference which is dependent on the brightness value of the substantially identical positions in the optical image whereto the signal levels relate, and the signal level difference comprises an offset difference which is independent of said brightness value.

The dependency of signal levels of an electronic sub-image signal as a function of brightness values in a sub-image is determined mainly by the sensitivity characteristic of the image sensor and is laid down in the image sensor picking up the sub-image. For example, for many image sensors the signal level is a linear function of the brightness value. The correction unit derives estimates as regards the offset and gain differences from the electronic sub-image signals by fitting the signal levels of individual sub-image signals relating to the same or substantially the same image information to a parameterization of the sensitivity characteristic. Notably a least-squares fit to a linear sensitivity characteristic is suitable for estimating the offset and gain differences. The correction unit derives an offset correction term and a gain correction factor from the estimated offset and gain differences. The offset correction term may be derived from a signed portion that is generated by a portion of the sensor that is not illuminated.

The correction unit calculates the offset correction term and the gain correction factor, applied to the signal processing system, from the estimates of the offset and gain differences. The offset correction term and the gain correction factor have values which are suitable to compensate for offset and gain differences. From the offset correction term, the gain correction factor and brightness values of the sub-images the signal processing system derives corrected brightness values which have been corrected in respect of offset difference as well as in respect of gain difference. Therefore, disturbances are counteracted in a composite image composed from the corrected brightness values.

The corrected brightness values are preferably formed as signal levels of the composite image. Such signal levels represent brightness values in the composite image. The corrected brightness values which are derived from brightness values of individual sub-images and relate to the same or substantially the same image information are substantially the same.

The correction unit is suitable for the formation of corrected brightness values for a composite image which is formed by combination of sub-images which have been picked up substantially simultaneously by separate image sensors, or by combination of sub-images which have been successively picked up by the same image sensor. The correction unit is also suitable for forming corrected brightness values of a color image composed of a red, a green and a blue sub-image.

It is to be noted that from Japanese Patent Application JP 64-148049 it is known to calculate corrected brightness values by multiplying brightness values of the sub-images exclusively by a correction factor.

A preferred embodiment of an X-ray examination apparatus in accordance with the invention is characterized in that the correction unit comprises a selection unit for deriving said offset correction term from dark parts of the sub-images and for deriving said correction factor from bright parts of the sub-images and brightness values in said dark parts being mainly lower than a ceiling value, brightness values in said bright parts being mainly higher than a threshold value.

For the dark parts of the sub-images the signal level difference substantially equals the offset difference. For the bright parts the signal level difference substantially equals the gain difference. As a result, the offset difference and the gain difference can be accurately estimated from brightness values of the dark parts and the bright parts, respectively, of the sub-images. A difference between signal levels of image signals derived by individual image sensors from substantially the same image information in the dark parts of the sub-images constitutes an accurate estimate of the offset difference. A difference between signal levels of image signals derived by the individual image sensors from substantially the same image information in bright parts in the sub-images constitutes an accurate estimate of the gain difference.

The estimates of the offset and gain differences on the one hand are more accurate as the ceiling value is taken to be lower and, the threshold value is taken to be higher. On the other hand, the ceiling value should be sufficiently higher than the lowest brightness value of the sub-images and the threshold value should be sufficiently lower than the highest brightness value in the sub-images, because otherwise insufficient or no brightness values will be available to derive the offset correction term and the gain correction factor therefrom. Suitable values for the ceiling and threshold values, enabling accurate estimates to be made of the offset and gain differences, are determined experimentally or by calculation.

A further preferred embodiment of an X-ray examination apparatus in accordance with the invention is characterized in that the signal processing system comprises an adder unit for adding said offset correction factor to a signal level of a sub-image signal, and a multiplier unit for multiplying a signal level of a sub-image by said gain correction factor.

The signal level difference increases approximately linearly as a function of the brightness values of the sub-images relating to substantially the same image information. The offset correction term equals the intercept of the signal level difference at light intensity zero. The gain correction factor equals the ratio of the increase of the signal levels of individual sub-image signals for substantially the same image information per unit of brightness value.

Corrected brightness values are calculated by adding the offset correction term to signal levels of one of the sub-image signals and by multiplying signal levels of one of the sub-image signals by the gain correction factor.

A further preferred embodiment of an X-ray examination apparatus in accordance with the invention is characterized in that the correction unit comprises an integration unit for deriving first and second lower mean values as integrated brightness values from the dark parts of the first and second sub-images, and an integration unit for deriving first and second upper mean values as integrated brightness values from bright parts of the first and second sub-images, and that the correction unit comprises an arithmetic unit for deriving the offset correction term from said lower mean values and for deriving the gain correction factor from said upper mean values.

The effect of noise on the corrected brightness values is reduced by deriving the offset correction term and the gain correction factor from integrated brightness values. A further preferred embodiment of an X-ray examination apparatus in accordance with the invention is characterized in that the arithmetic unit is arranged to calculate the offset correction term as the difference between the first and second lower mean values and to calculate the gain correction factor as the ratio of the first to the second upper mean values.

A further preferred embodiment of an X-ray examination apparatus in accordance with the invention is characterized in that the arithmetic unit is arranged to derive separate values for the difference between the first and second lower mean values from separate dark parts of the sub-images, and to derive separate values for the ratio of the first to the second upper mean values from separate bright parts of the sub-images.

The difference between the lower mean values constitutes an accurate estimate of the offset difference. By adding the offset difference as the offset correction term to brightness values of one of the sub-images, corrected brightness values are obtained which have been accurately compensated for in respect of offset difference. The ratio of the upper mean values is representative of the gain difference. This is because the ratio of the upper mean values constitutes an accurate estimate of the ratio of the increases of the signal levels per unit of light intensity of the individual image sensors. By multiplying brightness values of one of the sub-images by said ratio as the gain correction factor, corrected brightness values are obtained w have been accurately compensated for in respect of gain difference. The corrected brightness values have been corrected for differences in signal level not relating to image information.

By deriving upper and lower mean values from separate parts in the sub-images, an offset correction term and a gain correction factor are derived which are dependent on the part of the sub-images whereto they relate. Said offset correction term and gain correction factor are used to calculate corrected brightness values which have been compensated for in respect of offset and gain differences which vary in conformity with the position in the sub-images whereto they relate. As a result, corrected brightness values are obtained in which compensation is achieved for complex offset and gain differences which are caused, for example by vignetting differences in the sub-images.

A further preferred embodiment of an X-ray examination apparatus in accordance with the invention is characterized in that the correction unit comprises a lowpass filter for deriving the offset correction term from a spatial low-frequency component of said difference, and a low-pass filter for deriving the gain correction factor from a spatial low-frequency component of said ratio.

As a result of the use of the low-pass filter, it is prevented that the offset correction term and the gain correction factor are disturbed by isolated defective image elements in an image sensor; in the corrected brightness values brightness variations over comparatively large distances in the sub-images are thus avoided, for example vignetting variations.

Another object of the invention is to provide a method whereby variations of brightness values of the sub-images can be corrected in respect of offset difference as well as in respect of gain difference in order to counteract disturbances in the composite image. This object is achieved by means of a method in accordance with the invention which is characterized in that an offset correction term is derived from dark parts of the sub-images and a gain correction factor is derived from bright parts of the sub-images, brightness values in said dark parts being mainly lower than a ceiling value and brightness values in said bright parts being mainly higher than a threshold value, and that brightness values of a sub-image and said offset correction factor are added and brightness values of a sub-image and said gain correction factor are multiplied by one another.

Disturbances are counteracted in a composite image composed from the corrected brightness values by means of the method in accordance with the invention.

An image pick-up apparatus according to the invention is characterized in that it comprises a correction unit for correcting brightness values of the sub-images which is arranged to derive a gain correction factor and an offset correction term from the electronic sub-image signals-line. Such an image pick-up apparatus is needed for carrying-out the method of the invention.

These and other aspects of the invention will be apparent from and elucidated with reference to the embodiments described hereinafter.

DETAILED DESCRIPTION OF THE PREFERRED EMBODIMENTS

Figure 1:
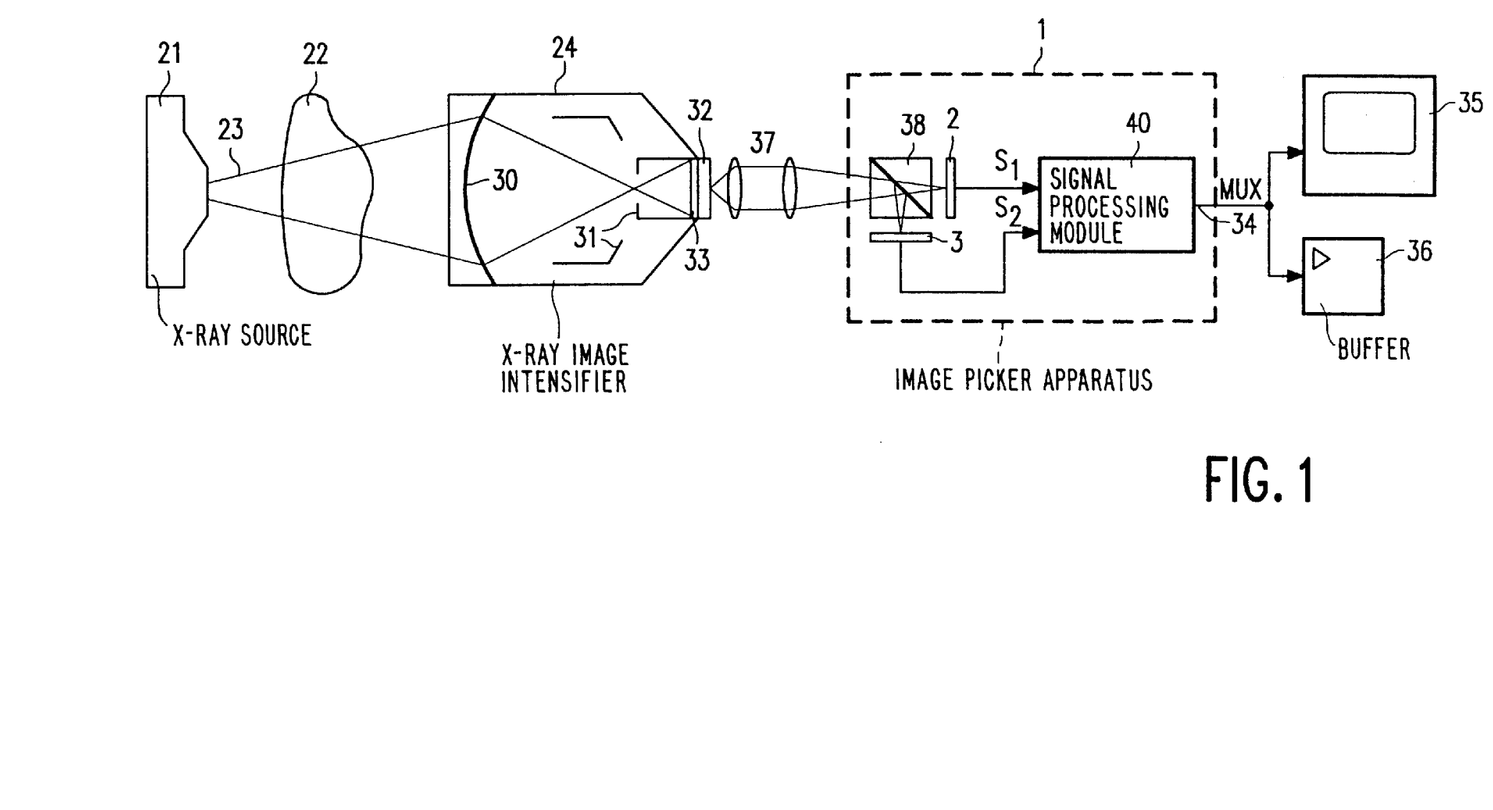
FIG. 1 shows diagrammatically an X-ray examination apparatus in accordance with the invention.

FIG. 1 is a diagrammatic representation of an X-ray examination apparatus 20 in accordance with the invention. The X-ray source 21 emits an X-ray beam 23 which irradiates an object 22, for example a patient to be examined radiologically. Due to differences in X-ray absorption within the patient, an X-ray image is formed on an entrance screen 30 of the X-ray image intensifier 24. The X-rays incident on the entrance screen are converted into photo-electrons which are guided to an exit window 32 by an electron optical system 31. The photo-electrons generate an optical image on the phosphor layer 33 on the exit window 32, which optical image is picked up by the image pick-up apparatus 1. Via an output 34 the image pick-up apparatus applies an electronic image signal to a monitor 35 on which the image information of the X-ray image is visualized, or to an image processing unit 36 for further processing of the image signal.

The optical image on the exit window 32 is imaged on two image sensors 2, 3 by a lens system 37 and a beam splitter 38. The image sensors are, for example CCD sensors comprising a large numbers of photosensitive elements and are positioned relative to the beam splitter in such a manner that pixels in the optical image which are imaged on photosensitive elements of one image sensor are imaged in intermediate spaces between photosensitive elements of the other image sensor. For example, the individual image sensors pick up alternating lines or bands of the optical image. Each image sensor supplies an electronic sub-image signal with signal levels representing brightness values in the sub-images. The electronic sub-image signals are combined in the signal processing module 40 so as to form an electronic image signal whose signal levels represent brightness values for the composite image. The image pick-up apparatus 1 supplies an electronic image signal to a display 35 and to a buffer 36 for a high-resolution composite image in order to enable suitable reproduction of image information in a medical X-ray image with small details.

Figure 2:
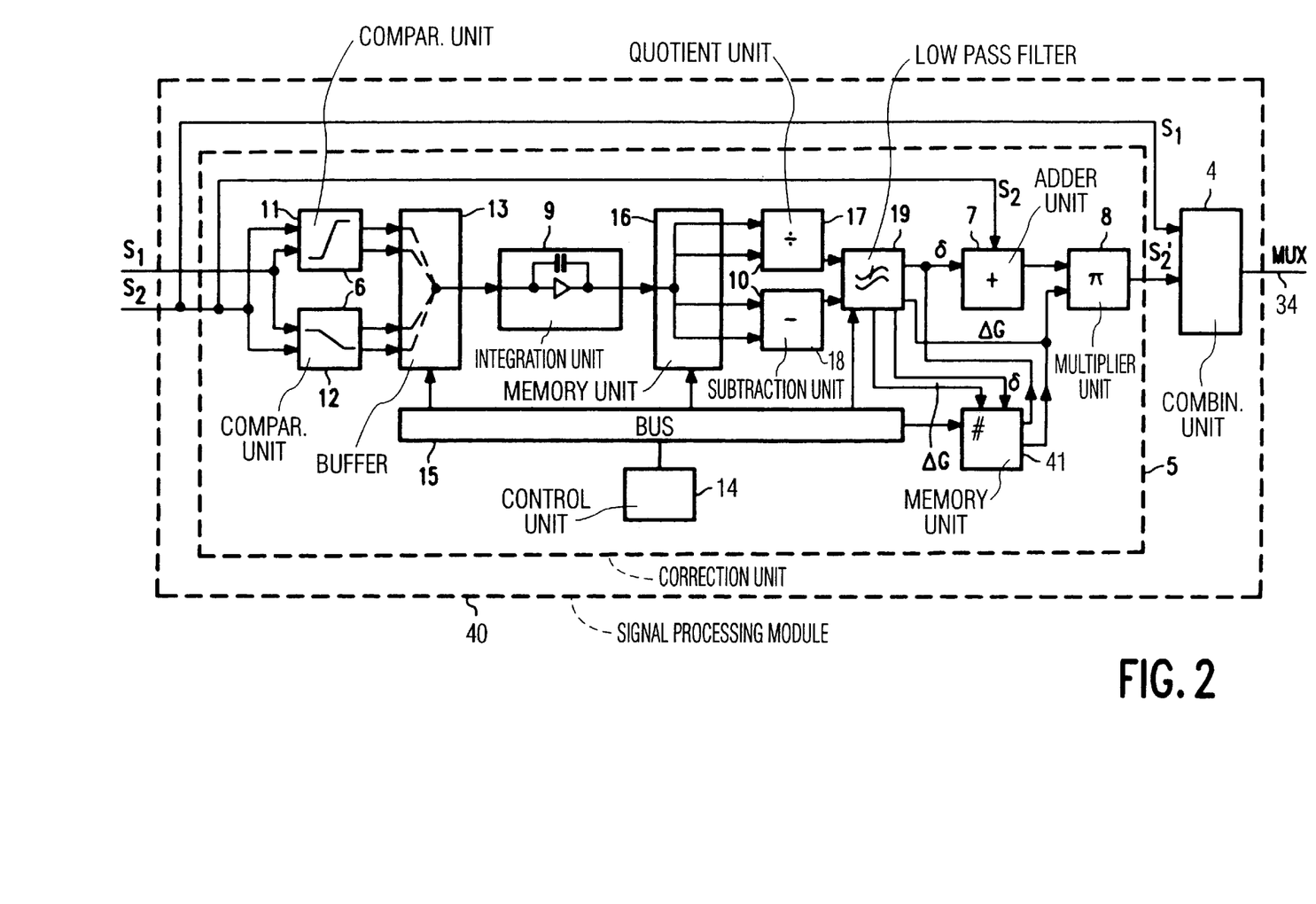
FIG. 2 shows diagrammatically a first embodiment of a signal processing module of the image pick-up apparatus in accordance with the invention.

FIG. 2 is a diagrammatic representation of a first embodiment of a signal processing module of the image pick-up apparatus in accordance with the invention. The signal processing module 40 comprises the correction unit 5 and the combination unit 4 for deriving signal levels representing corrected brightness values from the sub-image signals and for composing an electronic image signal for a composite image with the corrected brightness values. The sub-image signals $S_1$, $S_2$ of the image sensors 2, 3 are applied to the correction unit 5. Both sub-image signals are applied to the selection unit 6.

The sub-image signals $S_1$ and $S_2$ are applied to a first and a second comparison unit, 11, 12, of the selection unit 6. One comparison unit (11) selects signal parts from the bright parts from the sub-image signals $S_1$ and $S_2$, whereas the other comparison unit (12) selects signal parts from the dark parts of the two sub-images. These signal parts are applied to a buffer 13. Under the control of a control unit 14, capable of communicating with the buffer 13 via a bus 15, the first and second lower and upper mean values are determined from the individual signal parts by means of the integration unit 9. The first and the second upper mean value constitute the mean brightness value in the bright part of the first sub-image and the second sub-image, respectively. Analogously, the lower mean values are mean brightness values in the dark parts of the first sub-image and the second sub-image, respectively. Each of these lower and upper mean values is stored in a memory unit 16. The control unit 14 also communicates, via the bus 15, with the memory unit 16 in order to apply the first and second upper mean values to a quotient unit 17 of the arithmetic unit 15 which calculates the ratio of the first to the second upper mean values. Under the control of the control unit, the memory unit 16 applies the first and second lower mean values to a subtraction unit 18 of the arithmetic unit 10 which calculates the difference between the first and second lower mean values. To those skilled in the art it will be evident that the difference between the lower mean values can also be calculated by first determining for dark parts of the sub-images differences of brightness values relating to substantially the same image information, and by subsequently determining the mean value of these differences. A low-pass filter which is also controlled by the control unit 14, via the bus 15, is coupled to the outputs of the arithmetic unit 10. From the ratio and the difference, available as signal levels on the outputs of the arithmetic unit 10, the low-pass filter derives the offset correction term $\delta$ and the gain correction factor $\Delta G$ ($=G_1/G_2$). Under the control of the control unit 14, the gain correction factor is applied to the multiplier unit 8 by the low-pass filter 19. The offset correction term is applied to the adder unit 7 by the low-pass filter 19 under the control of the control unit 14. The offset correction term is added to the sub-image signal $S_2$ and by the adder 7 and the signal level on the output of the adder unit 7 is applied to the multiplier unit 8 in which it is multiplied by the gain correction factor. The output of the multiplier unit 8 then supplies a processed sub-image signal $S_2'=\delta G(S_2+\delta)$ with a compensated signal level, which processed sub-image signal has been compensated as regards gain and offset differences in comparison with the sub-image signal $S_1$. The signal levels of the sub-image signal of the first sub-image and of the signal on the output of the adder unit 7 represent corrected brightness values for the composite image. In order to form the electronic image signal for the composite image, the sub-image signal $S_1$ and the processed sub-image signal $S_2'$, are applied to the combination unit 4 which is, for example an interline/multiplex circuit. The interline/multiplex circuit forms an electronic image signal for the composite image in which image lines of the individual sub-images alternate. The combination unit then forms the electronic image signal MUX for the composite image in which gain and offset images have been accurately compensated, so that the composite image is reproduced substantially without disturbances.

The offset correction term and the gain correction factor are also stored in a memory unit 41. If the correction unit cannot derive a gain correction factor and/or offset correction term from the electronic sub-image signals, for example because images without said bright or dark parts are presented, stored values of the gain correction factor and the offset correction term can be used. The stored values relate, for example to a previously picked up image and a satisfactory correction will be obtained if said previously picked up image does not deviate excessively from the instantaneous image. "Default" values can also be stored in the memory unit 41. The memory unit 41 is read under the control of the control unit 14 which communicates with the memory unit 41 via the bus 15 for this purpose.

Figure 4:
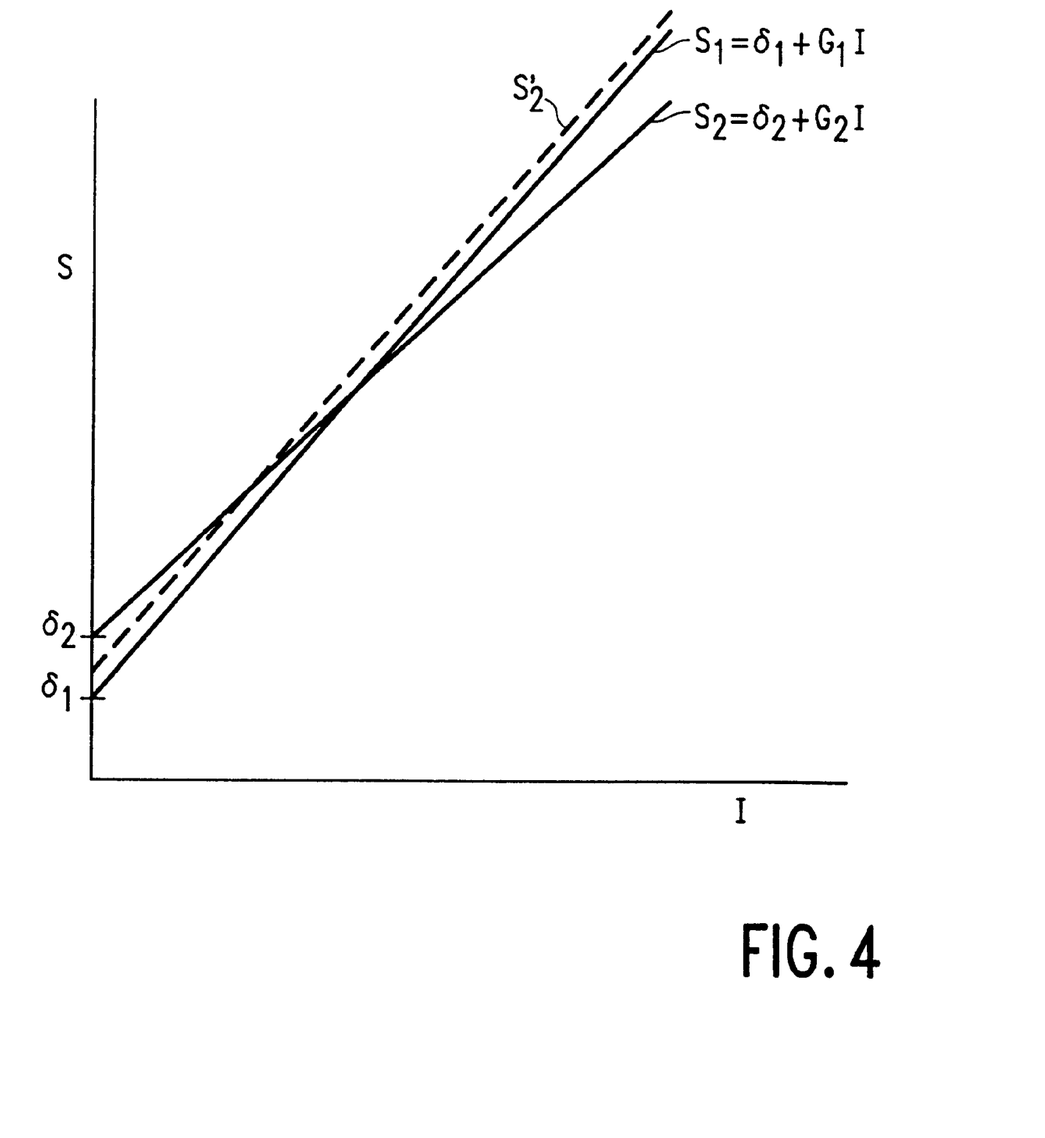
FIG. 4 is a graphic representation as a function of the brightness value of signal levels of the first the second electronic sub-image signal and of the corrected second electronic sub-image signal.

FIG. 4 shows a qualitative graphic representation as a function of the brightness value I of signal levels of the first and the second electronic sub-image signal $S_1$, $S_2$ and of the corrected second electronic sub-image signal $S_2'$. Both electronic sub-image signals relate to substantially the same image information. The signal level of the first sub-image signal is linearly dependent on the brightness value in the first sub-image, so $$S_1=\delta_1+G_1I.$$

Analogously, for the signal level of the second sub-image signal it holds that $$S_2=\delta_2+G_2I.$$

The offset difference thus amounts to $\delta=\delta_2-\delta_1$ and the gain difference is $(G_2-G_1)I$. The signal level of the processed electronic sub-image signal is given by $$S_2'=\delta_1(G_1/G_2)+G_1I.$$

The signal levels of the electronic sub-image signals $S_1$ and $S_2'$ are substantially equal and represent corrected brightness values of the composite image which is substantially free from disturbances due to differences in the offset and gain of the individual image sensors whereby the individual sub-images are picked up.

Figure 3:
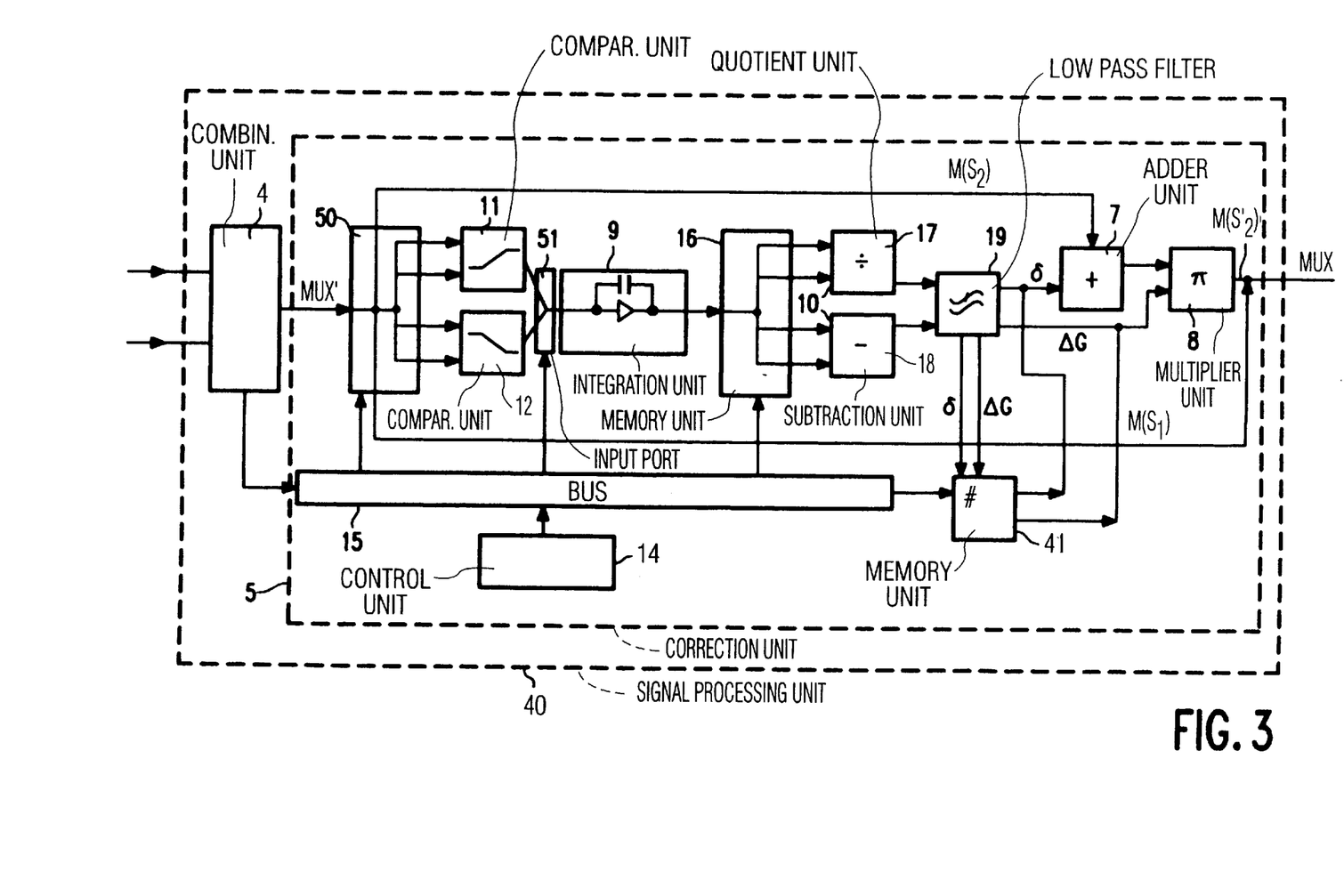
FIG. 3 shows diagrammatically a second embodiment of a signal processing module of the image pick-up apparatus in accordance with the invention.

FIG. 3 is a diagrammatic representation of a second embodiment of a signal processing module of the image pick-up apparatus in accordance with the invention. The sub-image signals $S_1$ and $S_2$ are applied to the interline/multiplex circuit or combination unit 4 which forms an electronic image signal MUX' in which signal levels of image lines of the two sub-images alternate. In order to enable reproduction of the composite image without disturbances, it is necessary to correct offset and gain differences in the signal levels in the signal MUX' by means of the correction unit 5. The combination unit is coupled, via the bus 15, to the control unit 14 in order to inform the control unit about the succession of signal parts of the individual sub-images in the signal MUX'. Via a distribution unit 50, the individual signal parts are applied to the selection unit 6 under the control of the control unit 14. The distribution unit 50 is controlled by the control unit 50 via the bus 15. The selection unit 6, comprising comparison units 11, 12, derives signal parts relating to the dark and bright parts in the individual sub-images from the signal MUX'. These signal parts are successively applied to the integration unit 9 via an input port 51 which is controlled by the control unit 14. From the individual signal parts the integration unit derives the first and second lower and upper mean values which are stored in the memory unit 16. Under the control of the control unit 14, first and second upper and lower mean values are successively read from the memory unit 16 so as to be applied to the arithmetic unit 10 which derives the offset correction term and the gain correction factor therefrom in cooperation with the low-pass filter 19.

The distribution unit 5 applies a signal part $M(S_2)$ of the signal MUX', relating to the second sub-image, to the adder unit 7 which adds the offset correction term to signal levels of said signal part. An output of the multiplier unit 8 is coupled to the adder unit 7. The multiplier unit 8 is also coupled, by way of an input, to an output of the low-pass filter 19 in order to receive the gain correction factor from the adder unit and multiply the signal level $M(S_2)+\delta$ on the output of the adder circuit 7 thereby. The output of the multiplier unit 8 also constitutes the output of the signal processing module 40. The output of the adder unit 7 supplies a signal part $M(S_2')=\Delta G(M(S_2)+\delta)$ which relates to the second sub-image with a signal level whereto the offset correction term has been added and which has been multiplied by the gain correction factor. The distribution unit 50 applies a signal part $M(S_1)$, relating to the first sub-image, to the output of the signal processing module 40, under the control of the control unit 14, without further processing. The output of the signal processing module 40 then carries the electronic image signal MUX, in which the signal parts $M(S_1)$ and $M(S_2')$ alternate, for the composite image. The signal MUX has been corrected for gain and offset differences, so that a composite image of high diagnostic quality can be reproduced by means of said signal substantially without disturbances.

The foregoing embodiments have been described on the basis of image composition from two sub-images; however, to those skilled in the art it will be evident that the invention can also be readily used when an image is composed from more than two sub-images, for example by applying the invention repeatedly to separate pairs of sub-images. In order to take into account drift in the gain and offset differences as a function of the position in the sub-images, if desirable, the correction unit can be arranged to derive the gain correction factor and the offset correction term for different areas in the sub-images. Signal parts from the individual areas in the sub-images are then corrected by means of the gain correction factors and offset correction terms of the areas under the control of the control unit 14. In an image pick-up apparatus in accordance with the invention, or in a contemporary X-ray examination apparatus comprising such an image pick-up apparatus, the functions of the signal processing module 40 can be readily implemented by means of a computer suitably programmed for this purpose or by means of an application specific electronic processor.

We claim:

1. An X-ray examination apparatus, comprising:
   an X-ray source for emitting an X-ray beam in order to form an X-ray image of an object,
   an X-ray detector for deriving an optical image from the X-ray image, and
   an image pick-up apparatus comprising one or more image sensors for deriving electronic sub-image signals from sub-images of the optical image, and a combination unit for combining the electronic sub-image signals so as to form an electronic image signal for a composite image,
   characterized in that the image pick-up apparatus further comprises a correction unit for correcting brightness values of the sub-images, which correction unit is arranged to derive a gain correction factor and an offset correction term from said electronic sub-image signals and comprises a signal processing system for deriving a corrected brightness value from a signal level of a sub-image signal, the gain correction factor and the offset correction term.

2. An X-ray examination apparatus as claimed in claim 1, characterized in that the correction unit comprises a selection unit for deriving said offset correction term from dark parts of the sub-images, and for deriving said gain correction factor from bright parts of the sub-images brightness values in said dark parts being mainly lower than a ceiling value, and brightness values in said bright parts being mainly higher than a threshold value.

3. An examination apparatus as claimed in claim 2, characterized in that the signal processing system comprises an adder unit for adding said offset correction factor to a signal level of a sub-image signal, and a multiplier unit for multiplying a signal level of a sub-image by said gain correction factor.

4. An X-ray examination apparatus as claimed in claim 1, characterized in that the correction unit comprises an integration unit for deriving first and second lower mean values as integrated brightness values from the dark parts of the first and second sub-images, and an integration unit for deriving first and second upper mean values as integrated brightness values from bright parts of the first and second sub-images, and an arithmetic unit for deriving the offset correction term from said lower mean values, and for deriving the gain correction factor from said upper mean values.

5. An x-ray examination apparatus as claimed in claim 4, characterized in that the arithmetic unit is arranged to calculate the offset correction term as the difference between the first and second lower mean values, and to calculate the gain correction factor as the ratio of the first to the second upper mean values.

6. An X-ray examination apparatus as claimed in claim 5, characterized in that the arithmetic unit is arranged to derive separate values for the difference between the first and second lower mean values from separate dark parts of the sub-images, and to derive separate values for the ratio of the first to the second upper mean values from separate bright parts of the sub-images.

7. An X-ray examination apparatus as claimed in claim 5, characterized in that the correction unit comprises a low-pass filter for deriving the offset correction term from a spatial low-frequency component of said difference, and a low-pass filter for deriving the gain correction factor from a spatial low-frequency component of said ratio.

8. An X-ray examination apparatus as claimed in claim 6, characterized in that the correction unit comprises a low-pass filter for deriving the offset correction term from a spatial low-frequency component of said difference, and a low-pass filter for deriving the gain correction factor from a spatial low-frequency component of said ratio.

9. An X-ray examination apparatus as claimed in claim 2, characterized in that the correction unit comprises an integration unit for deriving first and second lower mean values as integrated brightness values from the dark parts of the first and second sub-images, and an integration unit for deriving first and second upper mean values as integrated brightness values from bright parts of the first and second sub-images, and an arithmetic unit for deriving the offset correction term from said lower mean values, and for deriving the gain correction factor from said upper mean values.

10. An x-ray examination apparatus as claimed in claim 9, characterized in that the arithmetic unit is arranged to calculate the offset correction term as the difference between the first and second lower mean values, and to calculate the gain correction factor as the ratio of the first to the second upper mean values.

11. An X-ray examination apparatus as claimed in claim 3, characterized in that the correction unit comprises an integration unit for deriving first and second lower mean values as integrated brightness values from the dark parts of the first and second sub-images, and an integration unit for deriving first and second upper mean values as integrated brightness values from bright parts of the first and second sub-images, and an arithmetic unit for deriving the offset correction term from said lower mean values, and for deriving the gain correction factor from said upper mean values.

12. An X-ray examination apparatus as claimed in claim 10, characterized in that the correction unit comprises a low-pass filter for deriving the offset correction term from a spatial low-frequency component of said difference, and a low-pass filter for deriving the gain correction factor from a spatial low-frequency component of said ratio.

13. An x-ray examination apparatus as claimed in claim 11, characterized in that the arithmetic unit is arranged to calculate the offset correction term as the difference between the first and second lower mean values, and to calculate the gain correction factor as the ratio of the first to the second upper mean values.

14. An X-ray examination apparatus as claimed in claim 10, characterized in that the arithmetic unit is arranged to derive separate values for the difference between the first and second lower mean values from separate dark parts of the sub-images, and to derive separate values for the ratio of the first to the second upper mean values from separate bright parts of the sub-images.

15. An X-ray examination apparatus as claimed in claim 13, characterized in that the arithmetic unit is arranged to derive separate values for the difference between the first and second lower mean values from separate dark parts of the sub-images, and to derive separate values for the ratio of the first to the second upper mean values from separate bright parts of the sub-images.

16. An X-ray examination apparatus as claimed in claim 14, characterized in that the correction unit comprises a low-pass filter for deriving the offset correction term from a spatial low-frequency component of said difference, and a low-pass filter for deriving the gain correction factor from a spatial low-frequency component of said ratio.

17. An X-ray examination apparatus as claimed in claim 13, characterized in that the correction unit comprises a low-pass filter for deriving the offset correction term from a spatial low-frequency component of said difference, and a low-pass filter for deriving the gain correction factor from a spatial low-frequency component of said ratio.

* * * * *